United States Patent [19]

Yui et al.

[11] 4,368,280

[45] Jan. 11, 1983

[54] PARTIALLY CROSS-LINKABLE COMPOSITIONS AND PROCESS FOR PREPARING PARTIALLY CROSS-LINKED THERMOPLASTIC ELASTOMERS

[75] Inventors: Hiroshi Yui; Tetsuji Kakizaki; Yashinori Nishiya; Shinji Horie, all of Yokkaichi, Japan

[73] Assignee: Mitsubishi Petrochemical Company, Ltd., Tokyo, Japan

[21] Appl. No.: 221,623

[22] Filed: Dec. 31, 1980

[51] Int. Cl.$^3$ ............................................. C08L 23/26
[52] U.S. Cl. .................................... 523/211; 523/221; 524/515; 525/240
[58] Field of Search ................... 524/515; 260/29.6 R, 260/29.6 XA, 29.6 CM; 525/240; 523/206, 207, 211, 221

[56] References Cited

U.S. PATENT DOCUMENTS

| | | | |
|---|---|---|---|
| 4,239,862 | 12/1980 | Mattews et al. | 525/240 |
| 4,243,566 | 1/1981 | Burke, Jr. | 260/29.6 R |
| 4,247,652 | 1/1981 | Matsuda et al. | 525/240 |
| 4,252,969 | 2/1981 | Broering et al. | 260/29.6 XA |

*Primary Examiner*—John Kight, III
*Assistant Examiner*—Amelia B. Yarbrough
*Attorney, Agent, or Firm*—Oblon, Fisher, Spivak, McClelland & Maier

[57] ABSTRACT

A composition essentially consisting of a monoolefin copolymer rubber such as an ethylene-propylene copolymer rubber and a polyolefin resin such as polypropylene is granulated and then suspended, by stirring, in water containing a suspending agent. Then, a cross-linking agent is dispersed in the resulting suspension and introduced into the granules at a temperature lower than the decomposition temperature of the cross-linking agent to obtain a granular composition uniformly impregnated with the cross-linking agent. This composition is used as such or as a masterbatch to prepare partially cross-linked thermoplastic elastomers. Such compositions having a cross-linking agent content of not greater than 5% by weight based on the amount of the rubber component can be converted into partially cross-linked thermoplastic elastomers having a uniform degree of cross-linking, simply by heating the impregnated granules statically to effect the cross-linking reaction.

11 Claims, No Drawings

PARTIALLY CROSS-LINKABLE COMPOSITIONS AND PROCESS FOR PREPARING PARTIALLY CROSS-LINKED THERMOPLASTIC ELASTOMERS

BACKGROUND OF THE INVENTION

This invention relates to partially cross-linkable compositions useful in the preparation of thermoplatic elastomers essentially consisting of a monoolefin copolymer rubber and a polyolefin resin and having its rubber component cross-linked partially, and to an improved process for preparing such partially cross-linked thermoplastic elastomers.

Thermoplastic elastomers, which have excellent rubber elasticity and can be made into articles of any desired shape by common molding techniques for thermoplastic resins (such as extrusion, injection molding, etc.), have been attracting attention in the fields of automobile parts, electrical appliance parts, footwear, wire coatings, miscellaneous goods and the like, as rubbers or rubber-like materials that requires no vulcanization process.

While thermoplastic elastomers of the polystyrene, polyester or polyurethane type are prepared by polymerizing a hard segment and a soft segment, thermoplastic elastomers of the polyolefin type are prepared by melt-kneading a polyolefin resin (e.g., polypropylene) as a hard segment and a monoolefin copolymer rubber as a soft segment and, as the case may be, effecting partial cross-linking of the rubber during the melt-kneading. These thermoplastic elastomers have heretofore been developed with respect to the ethylene-propylene rubber/polypropylene resin system and are being positively put to practical use in the manufacture of automobile parts and the like, because they are characterized by relatively low costs and excellent properties such as flexibility, resistance to heat distortion, and weather resistance.

Among others, partially cross-linked thermoplastic elastomers of the polyolefin type have so excellent in resistance to heat distortion, rubber elasticity and the like that they are expected to be the most promising materials of all such thermoplastic elastomers. In order to prepare partially crosslinked thermoplastic elastomers, it is common practice to melt-mix a monoolefin copolymer rubber [e.g., an ethylene-propylene-diene copolymer rubber (EPDM) or an ethylene-propylene copolymer rubber (EPM)] and polypropylene mechanically in a Banbury mixer, kneader or the like and add a cross-linking agent thereto during this melt-mixing.

A number of processes for preparing such thermoplastic elastomers are well known and disclosed, for example, in Japanese Laid-Open Patent Publication Nos. 26838/'73, 145553/'76, 37953/'77 and 145857/'78. In these processes, however, little consideration is given to the method of addition of a cross-linking agent. The only method employed therein is to add a cross-linking agent directly. This direct addition method is poor in workability and, especially in the case of preparation with an extruder, fails to achieve acceptable efficiency in adding the cross-link agent. Among others, cross-linking agents in powder form cannot be easily mixed with granular monoolefin copolymer rubbers or crystalline polyolefin resins and, moreover, cannot provide satisfactory accuracy of the amount added, so that it is hard to obtain products having consistent qualities. Furthermore, in the case of preparation with an extruder, Banbury mixer or the like, the cross-linking agent added thereto may stick to the equipment heated to a temperature in the vicinity of 200° C. or scattered about before it is fully dispersed in the monoolefin copolymer rubber and the crystalline polypropylene resin. Thus, there is a possibility of the cross-linking agent (or organic peroxide) existing locally at very high concentrations. With the cross-linking agent in such a localized state, the composition tends to explode or ignite when it is subjected to shocks or contaminated with foreign substances (e.g., reducing agents such as amines) that accelerates decomposition of the cross-linking agent. In fact, such accidents have been reported, thus indicating that the direct addition method involves safety problems.

On the other hand, Japanese Laid-Open Patent Publication No. 1386/'79 discloses a process in which, from the viewpoint of safety, a massive masterbatch containing a cross-linking agent at a high concentration is prepared by using a roll mill, Banbury mixer, kneader or the like to incorporate the cross-linking agent into a monoolefin copolymer rubber at a temperature lower than the decomposition temperature of the cross-linking agent. Subsequently, this masterbatch is utilized to prepare partially cross-linked thermoplastic elastomers with the aid of a Banbury mixer, kneader or the like. However, this process poses other problems.

Specifically, the monoolefin copolymer the rubber must be plasticized in order to incorporate the cross-linking agent into the rubber at a temperature lower than the decomposition temperature of the cross-linking agent. On the other hand, the necessity of employing such a temperature as to cause no decomposition of the cross-linking agent makes it imperative to use a monoolefin copolymer rubber having a high propylene content and a low viscosity and a cross-linking agent having a high decomposition temperature, so that restrictions are imposed on both the monoolefin copolymer rubber and the cross-linking agent. Moreover, judging from the method of preparing the masterbatch, it is desirable to use cross-linking agents in powder form. Use of liquid cross-linking agents is disadvantageous from the viewpoint of workability and accuracy of the amount added.

Since the masterbatch thus obtained is in the form of a mass, the preparation of thermoplastic elastomers using it must be carried out not by means of an extruder, but by means of a Banbury mixer or kneader. Thus, in mixing this massive masterbatch with a monoolefin copolymer rubber and a crystalline polypropylene resin, dispersion of the cross-linking agent contained therein requires so much time that the cross-linking agent may begin to decompose before being dispersed to a full extent. As a result, the cross-link density tends to heighten in local areas, leading to the formation of localized tight gel in the resulting thermoplastic elastomer. Since such localized tight gel impairs the appearance and physical properties of products molded from the thermoplastic elastomer, cross-linking agent masterbatches need contain a cross-linking retarder in order prevent the formation of localized tight gel. Nevertheless, where an ethylene-propylene-diene copolymer rubber (EPDM) having a high ethylene content is used as the monoolefin copolymer rubber, it is difficult to prevent the formation of localized tight gel perfectly.

Another method of incorporating a cross-linking agent into a rubber is solution blending. Specifically, the rubber and the cross-linking agent are dissolved in a good solvent, blended and then reprecipitated from the solution. Though feasible in laboratories, this method is unsuitable for industrial purposes because it requires large amounts of organic solvent.

On the other hand, there is a well-known method of cross-linking a granular polyolefin resin by heating the resin in an aqueous medium to impregnate it with a cross-linking agent such as an organic peroxide or the like (Japanese Patent Publication No. 39264/'77, Japanese Laid-Open Patent Publication No. 34436/'72, and Japanese Laid-Open Patent Publication No. 43026/'73). However, the purpose of this method is to cross-link and expand polyolefin resins. Generally, polyolefin resins have a high degree of crystallinity. Accordingly, if a polyolefin resin is impregnated and cross-linked at a temperature lower than its melting point, differences in degree of impregnation and degree of cross-linking arise between the crystalline and the non-crystalline portion of the polyolefin resin, so that it is impossible to obtain a uniformly cross-linked product. For this reason, the impregnation temperature need to be nearly as high as the melting point of the polyolefin resin. As a result, a fusion inhibitor such as basic zinc carbonate, tricalcium phophate or the like must be added in order to prevent the granules of the polyolefin resin from fusing together.

BRIEF SUMMARY OF THE INVENTION

However, it has now been found that, if a monoolefin copolymer rubber is impregnated with a cross-linking agent in an aqueous medium, an exact amount of the cross-linking agent can be uniformly introduced thereinto without posing any of the above-described problems. Moreover, if a monoolefin copolymer rubber and a crystalline polyolefin resin coexist in an aqueous medium, the cross-linking agent is selectively introduced into the copolymer rubber. The same is true of a composite material comprising a mixtures of a monoolefin copolymer rubber and a crystalline polyolefin resin, and a granular composition having the cross-linking agent uniformly introduced into the rubber component thereof is obtained thereby.

Thus, the present invention is directed to a partially cross-linkable composition which contains an exact amount of a cross-linking agent in the undecomposed state and in a uniform manner and can be converted into a thermoplastic elastomer by heating statically or under any desired mixing conditions, and to a process for preparing a granular, partially cross-linked thermoplastic elastomer from such a composition, the thermoplastic elastomer being characterized in that it is uniformly cross-linked to any desired degree and it is free from deterioration due to mixing.

Specifically, the present invention provides a partially cross-linkable composition comprising (a) 100 parts by weight of a monoolefin copolymer rubber, (b) from 10 to 900 parts by weight of a polyolefin resin, and (c) from 0.1 to 40 parts by weight of a cross-linking agent, which is obtained by suspending a granular composition essentially consisting of the monoolefin copolymer rubber (a) and the polyolefin resin (b) in an aqueous medium and impregnating the suspended granular composition with the cross-linking agent (c) under such conditions as to cause essentially no decomposition of the cross-linking agent (c). In addition, it also provides a process for preparing a partially cross-linked thermoplastic elastomer which comprises the steps of forming a partially cross-linkable composition comprising (a) 100 parts by weight of a monoolefin copolymer rubber, (b) from 10 to 900 parts by weight of a polyolefin resin, and (c) from 0.1 to 5 parts by weight of a cross-linking agent, by suspending a granular compsition essentially consisting of the monoolefin copolymer rubber (a) and the polyolefin resin (b) in an aqueous medium and impregnating the suspended granular composition with the cross-linking agent (c) under such conditions as to cause essentially no decomposition of the cross-linking agent (c); and subsequently heating the partially cross-linkable composition to a sufficient temperature to decompose the cross-linking agent (c) and thereby cross-link the granular composition partially.

The cross-linking method employed in the preparation of a granular thermoplastic elastomer according to the present invention is a static one in which the addition of a cross-linking agent and the cross-linking reaction are carried out without resorting to any dynamic treatment such as mechanical melt-mixing.

In the preparation of thermoplastic elastomers, static cross-linking has heretofore been considered to be inferior to dynamic cross-linking. In Japanese Laid-Open Patent Publication No. 26838/'73, comparative data on dynamic and static cross-linking are described to show the superiority of the former. However, the static cross-linking method employed therein comprises melt-mixing a rubber and a resin, incorporating a cross-linking agent thereinto at a sufficiently low temperature to cause no decomposition of the cross-linking agent, forming the resulting composition into a sheet, and then heating the sheet in an oven to effect cross-linking. Moreover, since the decomposition temperature of cross-linking agent used was lower than the melting point of polypropylene present in the composition, the composition had a very high rubber content, that is, it consisted of 80 parts of an ethylene-propylene-diene copolymer rubber and 20 parts of polypropylene. Thus, this cross-linking method cannot be applied to compositions having a high propylene content. Furthermore, such mixing at low temperatures does not always cause the cross-linking agent to be dispersed satisfactorily. It seems, therefore, that dynamic cross-linking was judged to be more advantageous because the degree of dispersion was further improved during the mixing.

In contrast, the addition of a cross-linking agent according to the present invention is by impregnation in an aqueous medium. This method can be applied to granular compositions essentially consisting of a rubber and a resin in any desired proportion, whereby the cross-linking agent is selectively introduced into the rubber component of the granular composition and uniformly dispersed therein. Accordingly, the present invention has the following various advantages:

(1) In the practice of the present invention, the cross-linking agent which can be an organic peroxide is not handled at high temperatures, so that great safety is secured from an operational point of view.

(2) The addition of a cross-linking agent by impregnation permits accurate control of the amount of cross-linking agent added and, hence, consistent production of thermoplastic elastomers having desired qualities.

(3) Since the cross-linking agent is selectively and uniformly introduced into the rubber component, even static cross-linking acts uniformly on the rubber component. As a result, even in the case of highly cross-linkable ethylene-propylene-diene copolymer rubbers having a high ethylene content, the formation of localized tight gel is prevented.

(4) Since the cross-linking agent is selectively introduced into the rubber component, polypropylene which would otherwise tend to deteriorate during cross-linking undergoes very little deterioration.

(5) As an additional and unexpected merit, the hygienic quality (or soluble organic material content) of the thermoplastic elastomers according to the present invention is greatly improved when compared with conventional thermoplastic elastomers.

DETAILED DESCRIPTION OF THE INVENTION

The granular, partially cross-linkable composition according to the present invention comprises the following three components (a), (b) and (c).

(a) Monoolefin copolymer rubber

The monoolefin copolymer rubber used in the present invention is an essentially amorphous random copolymer obtained by copolymerizing two or more monoolefins and, if desired, at least one copolymerizable polyene with the aid of a Ziegler-Natta catalyst essentially consisting, for example, of a combination of a vanadium compund and an aluminum compound. Usually, one of the monoolefins is ethylene, and the other is propylene. However, other monoolefins (of the general formula $CH_2=CHR$) may be used. This monoolefin copolymer rubber can be a saturated compound such as an ethylene-propylene copolymer rubber (EPM). Alternatively, it can also be an ethylene-propylene-diene copolymer rubber (EPDM) in which at least one copolymerizable polyene is contained so as to impart the unsaturated nature to the copolymer. Usually, 1,4-hexadiene, dicyclopentadiene, methylenenorbornene, ethylidenenorbornene, propenylnorbornene, cyclooctadiene, methyltetrahydroindene or the like is used as the polyene.

(b) Polyolefin resin

The polyolefin resin used in the present invention is a high-molecular-weight thermoplastic resinous material in substantially crystalline solid form which is obtained by homopolymerizing or copolymerizing one or more olefins (such as ethylene, propylene, butene-1, pentene-1, 4-methylpentene-1, hexene-1, etc.) according to conventional procedure. Accordingly, crystalline polyolefin resins such as (low-density, medium-density or high-density) polyethylene, polypropylene, ethylene-propylene copolymer resins, ethylene-vinyl acetate copolymers, etc. can be used. Among these polyolefin resins, polypropylene is particularly preferred. Specific examples of polypropylene include isotactic and syndiotactic propylene homopolymers having a high degree of crystallinity as well as crystalline copolymers of propylene and at least one other straight-chain or branched α-olefin such as propylene-ethylene block or random copolymers, propylene-butene-1 block or random copolymers, propylene-butene-1-ethylene block or random terpolymers, propylene-hexene-1 block or random copolymers, propylene-hexene-1-ethylene block or random terpolymers, propylene 4-methylpentene-1 block or random copolymers, propylene-4-methylpentene-1-ethylene block or random terpolymers, etc. Among these propylene polymers, propylene homopolymers, propylene-ethylene copolymers and propylene-hexene-1-ethylene terpolymers are particularly preferred.

(c) Cross-linking agent

The cross-linking agent used in the present invention is impregnated into a granular composition essentially consisting of the monoolefin copolymer rubber and the polyolefin resin in an aqueous medium, without causing any substantial decomposition of the cross-linking agent. Accordingly, the cross-linking agent must be one which is capable of being impregnated into such a composition essentially consisting of the monoolefin copolymer rubber and the polyolefin resin.

The cross-linking agents which can be used in the present invention are oil-soluble ones, and typical examples thereof are aromatic or aliphatic organic peroxides and azo compounds. These compounds may be used alone or in admixture. Hydrophilic cross-linking agents or solid cross-linking agents (including pasty ones) can be used by dissolving them in a solvent which is capable of penetrating into the composition essentially consisting of the monoolefin copolymer rubber and the polyolefin resin. Although no particular limitation is placed on the half-life temperature of cross-linking agent used, it is desirable that a temperature which does not cause the granular composition to fuse together is employed in the impregnating and cross-linking steps and that the cross-linking agent has a 10-hour half-life temperature of from 60° to 90° C. from the viewpoint of cross-linking efficiency (or productivity).

Specific examples of the useful cross-linking agents are organic peroxides such as octanoyl peroxide, lauroyl peroxide, benzoyl peroxide, tert-butyl peroctoate, p-chlorobenzoyl peroxide, 2,4-dichlorobenzoyl peroxide, cyclohexanone peroxide, tert-butyl peroxybenzoate, methyl ethyl ketone peroxide, dicumyl peroxide, di-tert-butyl peroxide, 2,5-dimethyl-2,5-di(benzoylperoxy)hexane 2,5-dimethyl-2,5-di(tert-butylperoxy)hexane, di-tert-butyl diperoxyphthalate, tert-butylcumyl peroxide, diisopropylbenzene hydroperoxide, 1,3-bis(tert-butylperoxyisopropyl)benzene, tert-butyl peroxypivalate, 3,5,5-trimethylhexanoyl peroxide, 1,1-bis(tert-butylperoxy)-3,5,5-trimethylcyclohexane, 1,1-bis(tert-butylperoxy)cyclohexane, etc.; azo compounds such as azobisisobutyronitrile, etc.; and the like.

COMPOUNDING RATIOS

The granular composition used in the present invention essentially consists of 100 parts by weight of a monoolefin copolymer rubber and from 10 to 900 parts by weight of a polyolefin resin.

If the amount of monoolefin copolymer resin used is greater than 900 parts by weight per 100 parts by weight of the monoolefin copolymer rubber, the proportion of the rubber to be cross-linked is so small that the benefit of partial cross-linking is lost. Moreover, it becomes difficult to introduce the cross-linking agent quantitatively.

If the amount of polyolefin resin used is less than 10 parts by weight per 100 parts by weight of the monoolefin copolymer rubber, undesirable restrictions are imposed. For example, where an EPM or EPDM is used, it must be a relatively hard rubber having a high ethylene content so as to obtain the composition in the form of granules. Moreover, the resulting thermoplastic elastomer is poor in moldability and has little utility.

The granular composition consisting of the monoolefin copolymer rubber and the polyolefin resin is impregnated with a cross-linking agent which is used in an amount of from 0.1 to 40 parts by weight per 100 parts by weight of the monoolefin copolymer rubber. Although the amount of cross-linking agent used may exceed this range, undesirably severe impregnating conditions are required.

In order to prepare themoplastic elastomers having various degrees of cross-linking, this granular composition impregnated with the cross-linking agent is either used as such and heated statially, or used as a masterbatch and heated dynamically in admixture with a monoolefin copolymer rubber and/or a polyolefin resin.

In the case of static heating, thermoplastic elastomers having desirable qualities are obtained by using the cross-linking agent in an amount of from 0.1 to 5 parts by weight, preferably from 0.2 to 3 parts by weight, per 100 parts by weight of the monoolefin copolymer rubber.

In the case of dynamic heating, the cross-linking agent is preferably used in an amount of from 0.1 to 10 parts by weight, more preferably from 0.2 to 3 parts by weight, per 100 parts by weight of the monoolefin copolymer rubber.

The amount of cross-linking agent used in a particular partially cross-linkable composition depends on the type of cross-linking agent used, the type of monoolefin copolymer rubber used, compounding ratios, and the degree of cross-linking desired for the resulting partially cross-linked thermoplastic elastomer (the gel fraction, which is measured as the insoluble residue obtained by immersing 0.25 g of a sample in 100 ml of cyclohexane at 23° C. for 48 hours and then passing the resulting solution through a 80-mesh wire screen, is preferably in the range of from 30 to 97% by weight).

COMPOUNDING METHOD

In compounding the monoolefin copolymer rubber and the polyolefin resin, any common melt-mixing means such as a single-screw extruder, twin-screw extruder, roll mill, Banbury mixer, etc. may be used to obtain a granular composition in which both components are mixed homogeneously.

In the practice of the present invention, the composition essentially consisting of the monoolefin copolymer rubber and the polyolefin resin is formed into granules (or pellets) and suspended (or dispersed) in an aqueous medium. The size of these granules is of the order of from 1 to 7 mm, preferably from 2 to 5 mm, and the shape thereof may be cubic, cylindrical, spherical or the like.

IMPREGNATING METHOD

One typical method by which the granular composition essentially consisting of the monoolefin copolymer rubber and the polyolefin resin is impregnated with a cross-linking agent in an aqueous medium is to add the cross-linking agent to an aqueous suspension of the granular composition and then stir this mixture. An alternative method is to add the granular composition to an aqueous dispersion of the cross-linking agent and then stir this mixture. This impregnating operation is carried out at a temperature (usually ranging from ordinary temperature to 100° C.) sufficiently lower than the decomposition temperature of the cross-linking agent used, so as to cause essentially no decomposition of the cross-linking agent. Although the pressure may range from atmospheric pressure to 20 kg/cm$^2$, pressures in the vicinity of atmospheric pressure are usually employed.

In order to introduce the cross-linking agent uniformly into the rubber component of the granular composition being impregnated, it is desirable to continue this impregnating operation until the amount of cross-linking agent in the free state is reduced to no more than 5% by weight of the amount of cross-linking agent used. Usually, the impregnation time ranges from 0.5 to 10 hours. In the aqueous suspension, the granular composition essentially consisting of the monoolefin copolymer rubber and the polyolefin resin is usually present in an amount of from 5 to 300 parts by weight of water, preferably from 5 to 100 parts by weight, per 100 parts by weight of water. Although the granular composition and the cross-linking agent can be maintained in a stably suspended and dispersed state simply by stirring the aqueous medium well, the use of a suitable suspension stabilizer provides easier and stabler suspension thereof. For this purpose, suspension stabilizers which are commonly used in the aqueous suspension polymerization of vinyl monomers are generally usable. They include, for example, water-soluble polymeric substances such as polyvinyl alcohol, polyvinyl pyrrolidone, methyl cellulose, hydroxy cellulose, eltc.; anionic surface-active agents such as alkylbenzenesulfonates, etc.; nonionic surface-active agents such as polyoxyethylene alkyl ethers, etc.,; and water-insoluble inorganic salts such as magnesium oxide, calcium phosphate, etc. These suspension stabilizers are used, either alone or in admixture, in an amount of the order of from 0.01 to 10% by weight based on the amount of water.

During the above-described impregnating operation in which the granular composition essentially consisting of the monoolefin copolymer rubber and the polyolefin resin is impregnated with the cross-linking agent, other additives such as plasticizers, lubricants, ultraviolet stabilizers, antioxidants, blowing agents, cross-linking accelerators, cross-linking retarders, etc. may be added and impregnated simultaneously, if necessary.

This impregnating operation provides a partially cross-linkable composition of the present invention. Following the impregnating operation, the impregnated granular composition may be pickled, washed with water, and then dried, as is usual with the aqueous suspension polymerization of vinyl monomers. The partially cross-linkable composition thus obtained retains its original granular form.

CROSS-LINKING METHOD

Depending on its cross-linking agent content, the partially cross-linkable composition obtained as above is used as such or as a masterbatch to prepare a thermoplastic elastomer. Specifically, if the amount of cross-linking agent used is from 0.1 to 5 parts by weight, preferably from 0.2 to 3 parts by weight, per 100 parts by weight of the monoolefin copolymer rubber, a partially cross-linked thermoplastic elastomer can be prepared by heating the partially cross-linkable composition statically. The term "static heating" as used herein means heating the partially cross-linkable composition without subjecting it to any dynamic treatment such as melt-mixing. For example, the cross-linking reaction can be effected by heating the partially cross-linkable composition to a temperature of the order of from 50° to 150° C. in the aqueous suspension resulting from the above-described impregnating step, in the drying step carried out after pickling and washing with water, or in a subsequent step.

If the amount of cross-linking agent used is from 5.0 to 40 parts by weight, a thermoplastic elastomer can be prepared by adding a monoolefin copolymer rubber and, if necessary, a polyolefin resin to the partially cross-linkable composition so as to provide a cross-linking agent content of preferably from 0.1 to 10 parts by weight per 100 parts by weight of the rubber component, and then melt-mixing them. This melt-mixing can be carried out by means of common mixing machines such as Banbury mixer, various types of kneader, extruder, etc.

Of these cross-linking methods, static methods are preferred from the viewpoint of manufacturing efficiency. Among others, it is particularly preferable to effect the cross-linking reaction by stirring the aqueous suspension resulting from the impregnating step at a temperature of the order of from 50° to 150° C. for a period of from 0.5 to 10 hours.

The thermoplastic elastomers prepared by the process of the present invention are useful in the manufacture of various wire coatings (insulating coatings and sheaths) and industrial parts such as electrical appliance parts, automobile parts, etc. by extrusion, blow molding, injection molding and other techniques. Specific uses thereof include gaskets, flexible tubes, hose coatings, weatherstripping, flexible bumpers, side bumpers, protective lace, filler panels, lamp housings, wire cable coatings, air intake hoses and the like.

The present invention is further illustrated by the following examples. However, these examples are not intended for purposes of limitation, and variations may be made without departing from the spirit and scope of the invention.

In these examples, the following tests were carried out to characterize the various components of partially cross-linkable compositions and evaluate the physical properties thereof. In all of the tests described under items (5) to (8), measurements were made by using specimens stamped out of 2 mm thick injection-modled sheets.

The measuring methods and testing methods employed in the following examples were as follows:

(1) Cross-linking agent content

Depending on the type of cross-linking agent used, either a gas chromatographic method or an iodometric method was employed. Generally speaking, the gas chromatographic method is suited for many peroxides having a high decomposition temperature.

GAS CHROMATOGRAPHIC METHOD

The aqueous suspension resulting from the above-described impregnating step is filtered to remove the cross-linking agent-impregnaged granules and the suspending agent. Then, 100 g of the waste liquor thus obtained is weighed out and extracted with 1 kg of purified benzene. The amount of cross-linking agent present in the extract is determined by means of a gas chromatograph (Model GC7A manufactured by Shimazu Seisakusho), normal paraffin being used as an internal standard. Depending on the particular sample to be analyzed, operating conditions such as type of detector, type of column, column temperature, sample injection temperature, carrier gas flow rate, etc. are properly determined, as is the case with ordinary analyses.

On the other hand, the cross-linking agent in pure form is dissolved in or diluted with benzene to give a concentration of 100 p.p.m., and then subjected to gas chromatography in the manner as described above. After the standard peak area is obtained, the above measured value is compared therewith to determine the cross-linking agent concentration of the waste liquor. From this value, the amount of cross-linking agent introduced into the product is calculated back.

IODOMETRIC METHOD (1)

Accurately 0.5 g of the product granules are weighed out and placed in a 300-ml Erlenmeyer flask which has been purged with nitrogen gas, and 100 ml of purified benzene is added thereto. The cross-linking agent is dissolved therein at a temperature of 60° C. or below, and the resulting solution is made weakly acidic by adding 2 g of dry ice. After warming the flask to room temperature, 3 ml of an unsaturated solution of potassium iodide in benzene is added thereto. A reaction takes place at once, liberating iodine ($I_2$) in a few minutes. This reaction mixture is allowed to stand for 30 minutes, mixed well with 10 ml of carbonic acid, and then titrated with a 0.01 N thiosulfate solution. The cross-linking agent content is determined by comparing the volume of titrant added with the blank value.

IODOMETRIC METHOD (2)

In the same manner as in the above-described gas chromatographic method, 100 g of the waste liquor obtained from the impregnating step is extracted with 1 kg of purified benzene. Thereafter, the resulting benzene extract is worked up as follows:

(i) A 500-ml Erlenmeyer flask is charged with 40 ml of isopropyl alcohol, 5 ml of glacial acetic acid (depending on the type of the cross-linking agent to be analyzed, chloroform or titanium trichloride may be used instead of glacial acetic acid), and 10 ml of a saturated solution of sodium iodide in isopropyl alcohol, and then purged with argon.

(ii) To this flask is added 100 g of the above benzene extract.

(iii) After being fitted with a reflux condenser, the above flask is placed on a hot plate and heated to boil gently under reflux for 3 minutes. Thus, the peroxide reacts with the sodium iodide to precipitate iodine.

(iv) After cooling, the reaction mixture is titrated with 0.1 N sodium thiosulfate, and the cross-linking agent concentration of the waste liquor is calculated from the volume of titrant added. From this value, the amount of cross-linking agent introduced into the product is calculated back.

| (2) | Melt flow rate (MFR) (230° C. and 190° C.) ASTM-D-1238 (g/10 minutes) |
|---|---|
| (3) | Mooney viscosity ($ML_{1+4}$ 100° C.) JIS-K-6300 |
| (4) | Gel fraction |

The insoluble residue (% by weight) obtained by immersing 0.25 g of a sample in 100 ml of cyclohexane at 23° C. for 48 hours and then passing the resulting solution through a 80-mesh wire screen.

| (5) | Hardness (JIS-A) JIS-K-6301 |
|---|---|
| (6) | Tensile strength (at break) JIS-K-6301, No. 3 dumbbell specimen ($kg/cm^2$). |
| (7) | Tensile elongation (at break) JIS-K-6301, No. 3 dumbbell specimen (%). |
| (8) | Rate of deformation under heat and pressure | is mounted on a testing apparatus in which a load can be applied to the sample through the medium of heated silicone oil and any deformation of the sample can be measured. The major surfaces (1 cm×1 cm) of the sample are subjected to a load of 3 kg at a temperature of 130° or 150° C. for 1 hour, and then relieved of the load. After 10 minutes, the change (%) in thickness of the sample is measured.

(9) Q value

Using a Koka type flow tester, a sample is placed in a cylinder of 10 mm diameter, heated to 200° C., and then subjected to a load of 30 kg. The Q value ($\times 10^{-3}$ c.c./sec) is obtained as the valume of resin discharged in a period of 1 second from the orifice (1 mm in diameter and 2 mm in length) provided at the bottom of the cylinder.

(10) Localized tight gel

Using a hydraulic molding press, a 200 mm×200 mm×1 mm thick pressed sheet is made under the following conditions:

| Preheating | 180° C., 5 minutes |
|---|---|
| Heating under pressure | 180° C., 5 minutes, 150 kg/cm² |
| Cooling under pressure | 30° C., 1 minute, 150 kg/cm² |

If at least one opaque body of foreign matter is noted, localized tight gel is judged to be "present" in the sample.

(11) Injection moldability

A sample is injection-molded under the following conditions:

| Type of machine | 5-ounce in-line screw type injection machine |
|---|---|
| Mold | 100 mm × 100 mm × 2 mm thick sheet |
| Injection pressure | 750 kg/cm² |
| Injection temperature | 230° C. |
| Mold temperature | 40° C. |

If a 100 mm×100 mm×2 mm thick sheet which shows no delamination or distortion and is free of flow marks impairing its appearance can be made, the injection moldability of the sample is judged to be good.

(12) Potassium permanganate consumption

A test solution is prepared by washing a sample thoroughly with water and treating it with the leaching fluid specified for this test. Specifically, the sample is immersed in the leaching fluid which is used in an amount of 2 ml per square centimeter of the surface area of the sample, and allowed to stand at 95° C. for 30 minutes.

An Erlenmeyer flask is charged with 100 ml of water, 5 ml of diluted (1→3) sulfuric acid, and 5 ml of a 0.01 N potassium permanganate solution, and the resulting mixture is heated to boil for 5 minutes. After this mixture is discarded, the flask is washed with water. This flask is charged with 100 ml of the above test solution, 5 ml of diluted (1→3) sulfuric water, and 10 ml of a 0.01 N potassium permanganate solution in that order, and the resulting reaction mixture is heated to boil for 5 minutes. Immediately after the heating is discontinued, the reaction mixture is decolorized by adding 10 ml of a 0.01 N sodium oxalate solution. Then, the reaction mixture is titrated with a 0.01 N potassium permanganate solution until a faint red color no longer disappears.

A blank test is carried out in the same manner as described above, and the potassium permanganate consumption is calculated according to the following formula. The value thus obtained must be not greater than 10 p.p.m.

Potassium Permanganate Consumption (p.p.m.) =

$$\frac{(a - b) \times 1000}{100} \times 0.316$$

where
a = the volume (ml) of 0.01 N potassium permanganate solution added in the test proper
b = the volume (ml) of 0.01 N potassium permanganate solution added in the blank test

EXAMPLE 1

An autoclave having a capacity of 10 liters was charged with an aqueous medium by adding thereto 3.44 kg of pure water, 68.8 g of tricalcium phosphate as a suspending agent, and 0.103 g of sodium dodecylbenzenesulfonate as a suspension stabilizer. Using a one-liter compression type kneader for Ube with rubbers, 540 g of an ethylene-propylene copolymer rubber (having a propylene content of 26% by weight and a Mooney viscosity of 70 and containing no additional component) as a monoolefin copolymer rubber and 60 g of polypropylene (having a specific gravity of 0.91 and an MFR of 5.0 g/10 minutes at 230° C.) as a polyolefin resin were mixed at 170° C. for 5 minutes. The resulting mixture was formed into a sheet cutter. After this procedure was repeated several times, 1,000 g of the resulting granules were added to the aforesaid aqueous medium and suspended therein by stirring. As a cross-linking agent, 360 g of 1,3-bis(tert-butyl-peroxyisopropyl)benzene (commercially available from Kayaku-Noury Co. under the trade name of PERKADOX 14) was dissolved into 360 g of n-hexane and then added to the aforesaid suspension system. This cross-linking agent had a 10-hour half-life temperature of 127° C. After the autoclave was purged with nitrogen gas, impregnation was carried out by raising the temperature of the system to 60° C. and stirring its contents at that temperature for 5 hours. After cooling the system, its contents were taken out, pickled, washed with water, and then dried to obtain 1,360 g of a granular composition consisting of the monoolefin copolymer rubber and the polyolefin resin and containing the cross-linking agent. On determining its cross-linking agent content by the above-described gas chromatographic method, it was found that almost all of the cross-linking agent added had been introduced into the granular composition.

EXAMPLE 2

An autoclave having a capacity of 10 liters was charged with an aqueous medium by adding thereto 4.08 kg of pure water, 81.6 g of tricalcium phosphate as a suspending agent, and 0.122 g of sodium dodecylbenzenesulfonate as a suspension stabilizer. On the other hand, 540 g of a granular ethylene-propylene copolymer rubber (having a propylene content of 28% by weight, a Mooney viscosity of 88, and an iodine value of 14 and containing ethylidenenorbornene as a third component) as a monoolefin copolymer rubber and 60 g of polypropylene (having a specific gravity of 0.91 and an MFR of 5.0 g/10 minutes at 230° C.) as a polyolefin resin were mixed and granulated in the same manner as in Example 1. After this procedure was repeated several times, 1,500 g of the resulting granules were added to the aforesaid aqueous medium and suspended therein by stirring. As a cross-linking agent, 300 g of 2,5-dimethyl-2,5-di(tert-butylperoxy)hexane (commercially available from Nippon Fats and Oils Co. under the trade name of PERHEXA 25B and having a purity of 90%) was diluted with 240 g of n-hexane and then added to the aforesaid suspension system. This cross-linking agent had a 10-hour half-life temperature of 118° C. After the autoclave was purged with nitrogen gas, impregnation was carried out by raising the internal temperature of the system to 60° C. and stirring its contents at that temperature for 5 hours. After cooling the system, its contents were taken out, pickled, washed with water, and then dried to obtain 1,770 g of a granular composition consisting of the monoolefin copolymer rubber and the polyolefin resin and containing the cross-linking agent. On determining its cross-linking agent content b the same gas chromatographic method as in Example 1, it was found that almost all of the cross-linking agent added had been introduced into the granular composition.

COMPARATIVE EXAMPLE 1

An autoclave having a capacity of 10 liters was charged with an aqueous medium by adding thereto 3.8 kg of pure water, 76 g of tricalcium phosphate as a suspending agent, and 0.114 g of sodium dodecylbenzenesulfonate as a suspension stabilizer. On the other hand, 540 g of an ethylene-propylene copolymer rubber (having a propylene content of 26% by weight and a Mooney viscosity of 24 and containing no additional component) as a monoolefin copolymer rubber and 60 g of polypropylene (having 230° C.) as a polyolefin resin were mixed and granulated in the same manner as in Example 1. After this procedure was repeated several times, 1,000 g of the resulting granules were added to the aforesaid aqueous medium and suspended therein by stirring. As a cross-linking agent, 450 g of PERKADOX 14 (which was the same as used in Example 1) was dissolved in 450 g of n-hexane and then added to the aforesaid suspension system. After the autoclave was purged with nitrogen gas, impregnation was carried out by raising the internal temperature of the system to 60° C. and stirring its contents at that temperature for 5 hours. After cooling the system, its contents were taken out, washed with water, and then dried to obtain 1,410 g of a granular composition consisting of the monoolefin copolymer rubber and the polyolefin resin and containing the cross-linking agent. On determining its cross-linking agent content, it was found that only about 90% of the peroxide added had been introduced into the granular composition.

It can be seen from this comparative example that, if the amount of cross-linking agent used is greater than 40 parts by weight per 100 parts by weight of the monoolefin copolymer rubber, the impregnating method of the present invention encounters some difficulty in introducing almost all of the cross-linking agent added, and hence fails to achieve satisfactorily high efficiency.

EXAMPLE 3

In the same manner as in Example 1, 240 g of an ethylenepropylene copolymer rubber (having a propylene content of 34% by weight, a Mooney viscosity of 38, and an iodine value of 19 and containing ethylidenenorbornene as a third component) as a monoolefin copolymer rubber and 360 g of low-density polyethylene (having a specific gravity of 0.918 and an MFR of 45 g/10 minutes at 190° C.) as a polyolefin resin were mixed and granulated. After this procedure was repeated several times, 1,500 g of the resulting granules were treated with 60 g of a cross-linking agent, namely 1,1-bis(tert-butylperoxy)-3,3,5-trimethylcyclohexane (commercially available from Nippon Fats and Oils Co. under the trade name of PERHEXA 3 M), in the same manner as in Example 1. In consequence, there was obtained 1,560 g of a granular composition consisting of the monoolefin copolymer rubber and the polyolefin resin and containing the cross-linking agent. On determining its cross-linking agent content by the above-described iodometric method, it was found that almost all of the cross-linking agent added had been introduced into the granular composition.

EXAMPLE 4

In the same manner as in Example 1, 360 g of an ethylenepropylene copolymer rubber (having a propylene content of 43% by weight, a Mooney viscosity of 83, and an iodine value of 26 and containing ethylidenenorbornene as a third component) as a monoolefin copolymer rubber and 240 g of an ethylene-vinyl acetate copolymer (having a vinyl acetate content of 20% by weight and an MFR of 12 g/10 minutes at 190° C.) as a polyolefin resin were mixed and granulated. After this procedure was repeated several times, 1,500 g of the resulting granules were treated with 180 g of across-linking agent, namely dicumyl peroxide (commercially available from Nippon Fats and Oils Co. under the trade name of PERCUMYL D), in the same manner as in Example 1. In consequence, there was obtained 1,680 g of a granular composition consisting of the monoolefin copolymer rubber and the polyolefin resin and containing the cross-linking agent. On determining its cross-linking agent content by the above-described gas chromatographic method, it was found that almost all of the cross-linking agent added had been introduced into the granular composition.

EXAMPLE 5

In the same manner as in Example 1, 480 g of an ethylenepropylene copolymer rubber (having a propylene content of 32% by weight, a Mooney viscosity of 50, and an iodine value of 12 and containing dicyclopentadiene as a third component) as a monoolefin copolymer rubber and 120 g of polypropylene (having a specific gravity of 0.91 and an MFR of 5.0 g/10 minutes at 230° C.) as a polyolefin resin were mixed and granulated. After this procedure was repeated several times, 1,500 g of the resulting granules were treated with 360 g of a cross-linking agent, namely PERKADOX 14, in the same manner as in Example 1. In consequence, there was obtained 1,860 g of a granular composition consisting of the monoolefin copolymer rubber and the polyolefin resin and containing the cross-linking agent. On determining its cross-linking agent content by the above-described gas chromatographic method, it was found that almost all of the cross-linking agent added had been introduced into the granular composition.

EXAMPLE 6

Using a 30-mm twin-screw extruder (L/D=17), 100 parts by weight of a granular ethylene-propylene copolymer rubber (which was the same as used in Example 2) as a monoolefin copolymer rubber and 67 parts by weight of a polypropylene resin (having a specific gravity of 0.91 and an MFR of 5.0 g/10 minutes at 230° C.) as a polyolefin resin were mixed at a preset temperature of 190° C. and a screw revolution speed of 200 r.p.m., and then pelletized. Thereafter, 1,500 g of the resulting pellets were treated with 45 g of a cross-linking agent, namely benzoyl peroxide (commercially available from Nippon Fats and Oils Co. under the trade name of NIPER B), in the same manner as in Example 1. In consequence, there was obtained 1,545 g of a granular composition consisting of the monoolefin copolymer rubber and the polyolefin resin and containing the cross-linking agent. On determining its cross-linking agent content by the above-described iodometric method, it was found that almost all of the cross-linking agent added had been introduced into the granular composition.

EXAMPLE 7

Using the same extruder as described in Example 6, 100 parts by weight of a granular ethylene-propylene copolymer rubber (which was the same as used in Example 2) as a monoolefin copolymer rubber and 25 parts by weight of a polypropylene resin (having a specific gravity of 0.91 and an MFR of 5.0 g/10 minutes at 230° C.) as a polyolefin resin were mixed and pelletized. Thereafter, 1,500 g of the resulting pellets were treated with 60 g of a cross-linking agent, namely PERKADOX 14, in the same manner as in Example 1. In consequence, there was obtained 1,560 g of a granular composition consisting of the monoolefin copolymer rubber and the polyolefin resin and containing the cross-linking agent. On determining its cross-linking agent content by the above-described gas chromatographic method, it was found that almost all of the cross-linking agent added had been introduced into the granular composition.

REFERENCE EXAMPLE 1

Using the same extruder as described in Example 6, 100 parts by weight of a granular ethylene-propylene copolymer rubber (which was the same as used in Example 2) as a monoolefin copolymer rubber and 67 parts by weight of a polypropylene resin (having a specific gravity of 0.91 and an MFR of 5.0 g/10 minutes at 230° C.) as a polyolefin resin were mixed and pelletized.

EXAMPLE 8

In the same manner as in Example 1, 1,500 g of the pellets obtained in Reference Example 1 were treated with 0.9 g (that is, 0.1 part by weight per 100 parts by weight of the rubber component) of a cross-linking agent; namely PERKADOX 14. In consequence, there was obtained a granular composition consisting of the monoolefin copolymer rubber and the polyolefin resin and containing the cross-linking agent. It was confirmed by the above-described iodometric method that almost all of the cross-linking agent added had been introduced into the granular composition.

In a Brabender Plastograph having a capacity of 100 c.c., 60 g of this cross-linking agent-containing composition was kneaded at 200° C. for 10 minutes to decompose the cross-linking agent completely and thereby cross-link the composition partially. When measured as the insoluble residue obtained by extracting the partially cross-linked product with xylene at its boiling point for 10 hours and passing the resulting solution through a 80-mesh wire screen, xylene-insoluble gel fraction was 15%. This gel fraction consisted entirely of a cross-linked elastomer.

COMPARATIVE EXAMPLE 2

In the same manner as in Example 1, 1,500 g of the pellets obtained in Reference Example 1 were treated with 0.45 g of a cross-linking agent, namely PERKADOX 14. In consequence, there was obtained a granular composition containing the cross-linking agent. It was confirmed by the above-described gas chromatographic method that almost all of the cross-linking agent added had been introduced into the granular composition.

In a Brabender Plastograph having a capacity of 100 c.c., 60 g of this cross-linking agent-containing composition was kneaded at 200° C. for 10 minutes to decompose the cross-linking agent completely and thereby cross-link the composition partially. When measured by extracting the partially cross-linked product with xylene, its xylene-insoluble gel fraction was 3%.

It can be seen from this comparative example that, if the amount of cross-linking agent used is less than 0.1 part by weight per 100 parts by weight of the rubber component, the resulting composition cannot provide a sufficiently high gel fraction. That is, the resulting composition is unsatisfactory because a sufficient degree of cross-linking cannot be effected.

EXAMPLE 9

Using the same extruder as described in Example 6, 100 parts by weight of a granular ethylene-propylene copolymer rubber (which was the same as used in Example 2) as a monoolefin copolymer rubber and 900 parts by weight of a polypropylene resin (having a specific gravity of 0.91 and an MFR of 5.0 g/10 minutes at 230° C.) as a polyolefin resin were mixed and pelletized. Thereafter, 2,000 g of the resulting pellets were treated with 0.4 g (that is, 0.2 part by weight per 100 parts by weight of the rubber component) of a cross-linking agent, namely PERKADOX 14, in the same manner as in Example 1. In consequence, there was obtained a granular composition containing the cross-linking agent. It was confirmed by the above-described gas chromatographic method that almost all of the cross-linking agent added had been introduced into the granular composition.

COMPARATIVE EXAMPLE 3

In the same manner as in Example 6, 100 parts by weight of the same monoolefin copolymer rubber as used in Example 9 and 1,900 parts by weight of the same polyolefin resin as used in Example 9 were mixed and pelletized. Thereafter, 2,000 g of the resulting pellets were treated with 0.2 g (that is, 0.2 part by weight per 100 parts by weight of the rubber component) of a cross-linking agent (which was the same as used in Example 9) in the same manner as in Example 1. In consequence, there was obtained a granular composition containing the cross-linking agent. On determining its cross-linking agent content, it was found that only 0.09 part by weight (per 100 parts by weight of the rubber component) of the cross-linking agent added had been introduced into the particles of the rubber component.

It can be seen by comparison with Example 9 that, if the amount of polyolefin resin used is greater than 900 parts by weight per 100 parts by weight of the rubber component, impregnation of the rubber component with a cross-linking agent becomes difficult and this makes it impossible to introduce almost all of the cross-linking agent added.

EXAMPLE 10

Using a one-liter compression type kneader for use with rubbers, 400 g of an ethylene-propylene copolymer rubber (having a Mooney viscosity of 40 and a propylene content of 50% by weight and containing no additional component) and 200 g of crystalline polypropylene (having a specific gravity of 0.91 and an MFR of 5.0 g/10 minutes at 230° C.) were melt-mixed at 170° C. for 5 minutes. The resulting mixture was made into a sheet by means of a roll mill and then granulated by means of a sheet cutter. This procedure was repeated three times to obtain 1,800 g of a granular composition.

An autoclave having a capacity of 10 liters was charged with an aqueous medium by adding thereto 4.8 kg of pure water and 0.144 g of sodium dodecylbenzenesulfonate as a suspension stabilizer. Then, 1,600 g of the aforesaid granular composition was added to this aqueous medium and suspended therein by stirring. As a cross-linking agent, 400 g of PERKADOX 14 was dissolved in 400 g of n-hexane and then added to the aforesaid suspension system. After the autoclave was purged with nitrogen gas, impregnation was carried out by raising the internal temperature of the system to 60° C. and stirring its contents at that temperature for about 5 hours. After cooling the system, its contents were taken out, pickled with a 2% aqueous solution of nitric acid, washed with water, and then dried to obtain 2,000 g of a granular composition masterbatch.

APPLICATION EXAMPLE 1

Using an extruder and a compression type kneader, thermoplastic elastomers were prepared from 100 parts by weight of a granular ethylene-propylene copolymer rubber (which was the same as used in Example 2) as a monoolefin copolymer rubber, 67 parts by weight of crystalline polypropylene (which was the same as used in Example 10) as a polyolefin resin, and 4.2 parts by weight of the cross-linking agent-containing granular composition masterbactch obtained in Example 10. The respective operating conditions were as follows:

| Extruder | |
|---|---|
| Type: 30-mm twin-screw extruder, L/D = 17 | |
| Conditions: | |
| Screw revolution speed | 200 r.p.m. |
| Extrusion temperature (preset) | 190° C. |
| Compression type kneader | |
| Type: One-liter compression type kneader for use with rubbers | |
| Conditions: | |
| Rotor revolution speed | 70 r.p.m. |
| Kneading temperature (preset) | 170° C. |
| Kneading time | 10 minutes |

The thermoplastic elastomers thus obtained had the following physical properties. These physical properties were evaluated by using samples of 2 mm thick injection-molded sheets.

| Type of Mixer | Extruder | Compression type kneader |
|---|---|---|
| Gel fraction (% by weight) | 95.5 | 96.0 |
| Hardness (JIS-A) | 98 | 98 |
| 200% modulus (kg/cm$^2$) | 77 | 78 |
| Tensile strength (kg/cm$^2$) | 130 | 125 |
| Tensile elongation (%) | 580 | 560 |

EXAMPLE 11

In the same manner as in Example 10, 480 g of an ethylene-propylene copolymer rubber (which was the same as used in Example 3) as a monoolefin copolymer rubber and 120 g of a crystalline propylene-ethylene block copolymer resin (having a specific gravity of 0.90, an MFR of 15 g/10 minutes at 230° C., and an ethylene content of 8% by weight) as a polyolefin resin were mixed and granulated. After this procedure was repeated several times, 1,500 g of the resulting granules were treated with 6 g of a cross-linking agent, namely PERKADOX 14, in the same manner as in Example 10. In consequence, there was obtained 1,506 g of a granular composition consisting of the monoolefin copolymer rubber and the polyolefin resin and containing the cross-linking agent.

Using the same extruder as described in Example 10, a thermoplastic elastomer was prepared from the aforesaid granular composition.

The thermoplastic elastomer thus obtained had the following physical properties. These physical properties were evaluated by using samples of a 2 mm thick injection-molded sheet.

| | |
|---|---|
| Gel fraction (% by weight) | 73.0 |
| Hardness (JIS-A) | 68 |
| 200% modulus (kg/cm$^2$) | 33 |
| Tensile strength (kg/cm$^2$) | 47 |
| Tensile elongation (%) | 370 |

EXAMPLE 12

An autoclave having a capacity of 10 liters was charged with an aqueous medium by adding thereto 4,330 g of pure water, 86.6 g of tricalcium phosphate as a suspending agent, and 0.13 g of sodium dodecylbenzenesulfonate as a suspension stabilizer. Using a single-screw extruder, 100 parts by weight of an ethylene-propylene copolymer rubber (which was the same as used in Example 2) as a monoolefin copolymer rubber and 67 parts by weight of polypropylene (having a specific gravity of 0.91 and an MFR of 5.0 g/10 minutes at 230° C.) as a polyolefin resin were mixed and pelletized. Thereafter, 2,000 g of the resulting pellets were added to the aforesaid aqueous medium and suspended therein by stirring. As a cross-linking agent, 15 g (that is, 1.25 parts by weight per 100 parts by weight of the monoolefin copolymer rubber) of benzoyl peroxide was dissolved in 150 g of benzene and then added to the aforesaid suspension system. This cross-linking agent had a 10-hour half-life temperature of 127° C. After the autoclave was purged with nitrogen gas, impregnation was carried out by raising the internal temperature of the system to 60° C. and stirring its contents at that temperature for 5 hours. Subsequently, the stirring was continued at 85° C. for 6 hours and then at 90° C. for 2 hours to effect the cross-linking reaction. After cooling the system, its contents were taken out, pickled, washed with water, and then dried to obtain a partially cross-linked thermoplastic elastomer in the form of pellets. This product was further passed through a single-screw extruder, and the following physical properties thereof were then evaluated. The foregoing procedure was repeated five time to obtain a total of 5 samples.

| | |
|---|---|
| Gel fraction (% by weight) | 75–78 |

-continued

| | |
|---|---|
| Hardness (JIS-A) | 97-98 |
| Tensile strength (kg/cm$^2$) | 120-130 |
| Tensile elongation (%) | 500-550 |
| Rate of deformation under heat and pressure (%) at 130° C. | 0.8-1.5 |
| at 150° C. | 4.5-6.5 |
| Potassium permanganate consuption (p.p.m.) | 0-0.2 |
| Q value ($\times 10^{-3}$ c.c./sec) | 1.8-2.2 |
| Localized tight gel | Absent from all samples |
| Injection moldability | Good for all samples |

COMPARATIVE EXAMPLE 4

A partially cross-linked thermoplastic elastomer was prepared by compounding the same monoolefin copolymer rubber and polyolefin resin as used in Example 12 in the same ratio as employed in Example 12 and subjecting them to a conventional method (that is, dynamic cross-linking by melt-mixing).

Specifically, using a roll mill, 400 g of PERKADOX 14/40 (containing PERKADOX 14 at a concentration of 40% by weight) as a cross-linking agent, 40 g of dibenzothiazolyl disulfide as a cross-linking retarder, and 360 g of an ethylene-propylene copolymer rubber (having a propylene content of 40% by weight and a Mooney viscosity of 50 and containing no additional component) were mixed at 50° C. for 2 minutes to obtain a cross-linking agent-containing rubber masterbatch in the form of a mass. Then, a 20-liter Banbury mixer for use with rubbers was preset at a temperature of 110° C., charged with 8.4 kg (or 100 parts by weight) of an ethylene-propylene copolymer rubber (which was the same as used in Example 12), 5.6 kg (or 67 parts by weight) of polypropylene (which was the same as used in Example 12), and 525 g (corresponding to a final cross-linking agent content of 1.22 parts by weight per 100 parts by weight of the monoolefin copolymer rubber which was approximately equal to that employed in Example 12) of the aforesaid rubber masterbatch, and operated for about 7 minutes to effect dynamic cross-linking.

Thereafter, its contents were taken out, formed into a sheet by means of a roll mill, pelletized by means of a sheet cutter, and then passed through a single-screw extruder to obtain a partially cross-linked thermoplastic elastomer in the form of pellets. The foregoing procedure was repeated fives times to obtain a total of 5 samples, and the following physical properties of each sample were evaluated.

| | |
|---|---|
| Gel fraction (% by weight) | 90.5-91.9 |
| Q value ($\times 10^{-3}$ c.c./sec) | 25-31 |
| Localized tight gel | Present in all samples |

COMPARATIVE EXAMPLE 5

Using a Banbury mixer, 8.4 kg (or 100 parts by weight) of an ethylene-propylene copolymer rubber (which was the same as used in Example 5) as a monoolefin copolymer rubber, 5.6 kg (or 67 parts by weight) of polypropylene (which was the same as used in Example 12) as a polyolefin resin, and 525 g of a cross-linking agent-containing rubber masterbatch (which was the same as used in Comparative Example 4) were mixed in the same manner as in Comparative Example 4. The partially cross-linked thermoplastic elastomer thus obtained was passed through a single-screw extruder, and the physical properties thereof were then evaluated.

| | |
|---|---|
| Gel fraction (% by weight) | 92 |
| Hardness (JIS-A) | 98 |
| Tensile strength (kg/cm$^2$) | 110 |
| Tensile elongation (%) | 380 |
| Rate of deformation under heat and pressure (%) at 130° C. | 4 |
| at 150° C. | 19 |
| Potassium permanganate consuption (p.p.m.) | 2.5 |
| Q value ($\times 10^{-3}$ c.c./sec) | 26 |
| Localized tight gel | Absent |
| Injection moldability | Good |

In comparative Examples 4 and 5, cleavage of polypropylene molecules by the cross-linking agent was so marked that the resulting Q value was abnormally higher than that of Example 12. Moreover, it may be seen that the product of Example 12 had far more excellent properties than that of Comparative Example 5.

EXAMPLE 13

The procedure of Example 12 was repeated except that the cross-linking agent used was 0.3 part by weight of benzoyl peroxide per 100 parts by weight of the monoolefin copolymer rubber. In consequence, there was obtained a partially cross-linked thermoplastic elastomer in the form of pellets. This product was passed through a single-screw extruder, and the following physical properties thereof were then evaluated.

| | |
|---|---|
| Gel fraction (% by weight) | 46 |
| Hardness (JIS-A) | 97 |
| Tensile Strength (kg/cm$^2$) | 112 |
| Tensile elongation (%) | 320 |
| Rate of deformation under heat and pressure (%) at 130° C. | 8 |
| at 150° C. | 20 |
| Localized tight gel | Absent |
| Injection moldability | Good |

EXAMPLE 14

The procedure of Example 12 was repeated except that the cross-linking agent used was 2.5 parts by weight of tert-butyl peroctoate (commercially available from Nippon Fats and Oils Co. under the trade name of PERBUTYL O) per 100 parts by weight of the monoolefin copolymer rubber. The following physical properties of the resulting product were evaluated.

| | |
|---|---|
| Gel fraction (% by weight) | 89 |
| Hardness (JIS-A) | 98 |
| Tensile strength (kg/cm$^2$) | 150 |
| Tensile elongation (%) | 280 |
| Rate of deformation under heat and pressure (%) at 130° C. | 0 |
| at 150° C. | 3 |
| Localized tight gel | Absent |
| Injection moldability | Good |

EXAMPLE 15

The procedure of Example 12 was repeated except that 100 parts by weight of an ethylene-propylene copolymer rubber (having a propylene content of 28% by weight, a Mooney viscosity of 51, and an iodine value of 15 and containing ethylidenenorbornene as a third component) as a monoolefin copolymer rubber, 11 parts by weight of a propylene-ethylene block copolymer resin (having a specific gravity of 0.90, an MFR of 15 g/10 minutes at 230° C., and an ethylene content of 8% by weight) as a polyolefin resin, and 0.72 part by weight of benzoyl peroxide as a cross-linking agent were used. The following physical properties of the resulting product were evaluated.

| Gel fraction (% by weight) | 51 |
| Hardness (JIS-A) | 71 |
| Tensile strength (kg/cm$^2$) | 70 |
| Tensile elongation (%) | 230 |
| Rate of deformation under heat and pressure (%) | |
| at 130° C. | 14 |
| at 150° C. | 29 |

EXAMPLE 16

The procedure of Example 12 was repeated except that 100 parts by weight of the same monoolefin copolymer rubber, 800 parts by weight of a propylene-hexene-1 random copolymer resin (having a specific gravity of 0.88, an MFR of 7 g/10 minutes at 230° C.), and a hexene-1 content of 13.1% by weight) as a polyolefin resin, and 0.62 part by weight of benzoyl peroxide polyolefin resin, and 0.62 part by weight of benzoyl peroxide as a cross-linking agent were used. The following physical properties of the resulting product were evaluated.

| Gel fraction (% by weight) | 92 |
| Hardness (JIS-A) | 98 |
| Tensile strength (kg/cm$^2$) | 210 |
| Tensile elongation (%) | 600 |
| Rate of deformation under heat and pressure (%) | |
| at 130° C. | 12 |
| Localized tight gel | Absent |
| Injection moldability | Good |

What is claimed as new and intended to be covered by Letters Patent is:

1. A partially cross-linkable composition, comprising:
   (a) 100 parts by weight of a monoolefin copolymer rubber which is an essentially amorphous random copolymer of at least two monoolefins, and optionally at least one copolymerizable polyene, prepared by copolymerizing said monomers in the presence of a Ziegler-Natta catalyst;
   (b) from 10 to 900 parts by weight of a substantially crystalline thermoplastic solid resin obtained by homopolymerizing an α-olefin or copolymerizing an α-olefin with at least one other olefin or other ethylenically unsaturated monomer; and
   (c) from 0.1 to 40 parts by weight of a cross-linking agent, which composition is obtained by suspending a granular composition of a particle size ranging from 1 to 7 mm and essentially consisting of the monoolefin copolymer rubber (a) and the polyolefin resin (b) in an aqueous medium and impregnating the suspended granular composition with the cross-linking agent (c) under conditions which result in essentially no decomposition of the cross-linking agent.

2. The composition according to claim 1 wherein the α-olefin is propylene.

3. The composition according to claim 1 wherein the cross-linking agent (c) is an oil-soluble organic peroxide or azo compound having a 10-hour half-life temperature of from 60° to 90° C.

4. The composition according to claim 1 wherein the cross-linking agent (c) is present in an amount of from 0.1 to 5 parts by weight per 100 parts by weight of the monoolefin copolymer rubber (a).

5. The composition according to claim 1 which is obtained by suspending from 5 to 300 parts by weight of the granular composition essentially consisting of the monoolefin copolymer rubber (a) and the polyolefin resin (b) in 100 parts by weight of water and impregnating the suspended granular composition with the cross-linking agent (c).

6. The composition according to claim 5 wherein from 5 to 100 parts by weight of the granular composition is suspended in 100 parts by weight of water.

7. The composition according to claim 5, wherein the granular composition is held in suspension by stirring the water containing a suspension stabilizer selected from the group consisting of water-soluble polymeric substances, anionic surface-active agents, nonionic surface-active agents and water-insoluble inorganic salts.

8. A process for preparing a partially cross-linked thermoplastic elastomer, which comprises the steps of:
   (1) forming a partially cross-linkable composition which retains its original granular form by suspending a granular composition of a particle size ranging from 1 to 7 mm in an aqueous medium, said granules consisting of (a) 100 parts by weight of a monoolefin copolymer rubber which is an essentially amorphous random copolymer of at least two monoolefins, and optionally at least one copolymerizable polyene, obtained by copolymerizing said monomers in the presence of a Ziegler-Natta catalyst and (b) from 10 to 900 parts by weight of a substantially crystalline thermoplastic solid resin obtained by homopolymerizing an α-olefin or copolymerizing an α-olefin with at least one other olefin or other ethylenically unsaturated comonomer;
   (2) impregnating the suspended granular composition with from 0.1 to 40 parts by weight of a cross-linking agent under conditions in which essentially no decomposition of the cross-linking agent occurs;
   (3) subsequently heating the partially cross-linkable composition to a temperature sufficient to decompose the cross-linking agent, thereby partially cross-linking the granular composition; and
   (4) finally washing and drying the partially cross-linked granular composition.

9. The process according to claim 8 wherein the cross-linking agent (c) is used in an amount of from 0.2 to 3 parts by weight per 100 parts by weight of the monoolefin copolymer rubber (a).

10. The composition according to claim 1, wherein said granules are impregnated with said cross-linking agent at a temperature ranging from ambient temperature to 100° C.

11. The composition of claim 1, wherein said granular composition is impregnated with said cross-linking agent at a temperature less than the decomposition temperature of the cross-linking agent.

* * * * *